United States Patent
Borrits et al.

(10) Patent No.: US 12,524,537 B2
(45) Date of Patent: Jan. 13, 2026

(54) ELECTRONIC CONTROL SYSTEM

(71) Applicant: HITACHI ASTEMO, LTD., Hitachinaka (JP)

(72) Inventors: Guillaume Borrits, Tokyo (JP); Kota Ideguchi, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 240 days.

(21) Appl. No.: 18/264,452

(22) PCT Filed: Sep. 22, 2021

(86) PCT No.: PCT/JP2021/034901
§ 371 (c)(1),
(2) Date: Aug. 7, 2023

(87) PCT Pub. No.: WO2022/176253
PCT Pub. Date: Aug. 25, 2022

(65) Prior Publication Data
US 2024/0104204 A1    Mar. 28, 2024

(30) Foreign Application Priority Data
Feb. 19, 2021    (JP) .................. 2021-025704

(51) Int. Cl.
*G06F 21/56*    (2013.01)

(52) U.S. Cl.
CPC ........ *G06F 21/56* (2013.01); *G06F 2221/034* (2013.01)

(58) Field of Classification Search
CPC .... G06F 21/56; G06F 21/55; G06F 2221/034; G05B 9/02; G05B 19/048
See application file for complete search history.

(56) References Cited

U.S. PATENT DOCUMENTS

| | | | |
|---|---|---|---|
| 10,002,258 B2 * | 6/2018 | Litichever | G06F 21/604 |
| 11,106,787 B2 * | 8/2021 | Hakuta | G06F 21/55 |

(Continued)

FOREIGN PATENT DOCUMENTS

| | | |
|---|---|---|
| JP | 2017-152762 A | 8/2017 |
| JP | 2017-215788 A | 12/2017 |

(Continued)

OTHER PUBLICATIONS

Wedel et al. Safe and Secure Development: Challenges and Opportunities, Apr. 3, 2018, SAE International, pp. 1-9. (Year: 2018).*

(Continued)

*Primary Examiner* — Lynn D Feild
*Assistant Examiner* — Abdullah Almamun
(74) *Attorney, Agent, or Firm* — Foley & Lardner LLP (57) ABSTRACT

Provided is an electronic control system configured to read a log recording an operation of a device and to detect a security event that is an event related to information security; execute a safety feature serving as a measure against a safety event that is an event related to functional safety; execute a security feature serving as a measure against the security event; store correspondence information indicating at least one of the safety feature and the security feature corresponding to the security event; and identify, based on the correspondence information, a feature corresponding to the security event to execute the identified feature, wherein the correspondence information records the event classified into at least one of the security events so as to correspond to the safety feature.

3 Claims, 6 Drawing Sheets

(56) References Cited

U.S. PATENT DOCUMENTS

| | | | |
|---|---|---|---|
| 2005/0240319 A1* | 10/2005 | Sawada | B60W 50/14 |
| | | | 701/1 |
| 2015/0295944 A1 | 10/2015 | Yunoki et al. | |
| 2016/0259340 A1* | 9/2016 | Kay | B65F 3/00 |
| 2017/0142140 A1* | 5/2017 | Muddu | G06V 10/225 |
| 2017/0221279 A1* | 8/2017 | Yu | G06F 21/57 |
| 2017/0244594 A1 | 8/2017 | Shiota et al. | |
| 2019/0081960 A1* | 3/2019 | Kupfer | H04L 63/1416 |
| 2019/0182267 A1* | 6/2019 | Aher | H04W 12/088 |
| 2019/0349394 A1* | 11/2019 | Kishikawa | H04L 63/1416 |
| 2019/0371085 A1* | 12/2019 | Kishikawa | G08G 1/0112 |
| 2020/0242247 A1 | 7/2020 | Morita et al. | |
| 2021/0344700 A1* | 11/2021 | Ueno | H04L 12/40169 |
| 2021/0374290 A1* | 12/2021 | Bildhaiya | G06F 21/74 |
| 2021/0406381 A1* | 12/2021 | Heisrath | H04L 63/123 |
| 2022/0206465 A1* | 6/2022 | Yamamoto | G05B 19/418 |

FOREIGN PATENT DOCUMENTS

| | | |
|---|---|---|
| JP | 2019-073102 A | 5/2019 |
| JP | 2019-205125 A | 11/2019 |
| WO | WO-2015/001594 A1 | 1/2015 |

OTHER PUBLICATIONS

International Search Report with English Translation and Written Opinion dated Dec. 14, 2021 in corresponding International Patent Application No. PCT/JP2021/034901 (9 pages).

* cited by examiner

ELECTRONIC CONTROL SYSTEM

TECHNICAL FIELD

The present invention relates to an electronic control system.

BACKGROUND ART

A large number of electronic control devices are mounted on a vehicle and implement advanced processing by communicating with each other. There is functional safety as preparation for a case where a failure occurs in a device, and research and development have been widely conducted heretofore on countermeasures against a safety event that poses a threat to the functional safety. In recent years, an electronic control device generally communicates with the outside, and it is also required to cope with a security event related to information security, such as an attack through communication. PTL 1 discloses a control device including: a communication interface unit configured to perform communication processing with an external device; a security processing unit having a determination unit and a security procedure unit, wherein the determination unit is configured to determine whether there is a denial-of-service attack and, when a denial-of-service attack is detected, to cause the communication interface unit to perform reception restriction and issue an instruction to the security procedure unit to attach, to outgoing data, interception information data indicating that the reception restriction is performed, and the security procedure unit is configured to replace, according to the instruction from the determination unit, for outgoing data from a safety processing unit at the time of transmission, loop-back data that is included in incoming data from the external device and is to be sent back to the external device with the interception information data; and the safety processing unit having a black channel diagnosis unit configured to perform a black-channel diagnosis for checking integrity of incoming data based on predetermined data included in the incoming data, and a black channel sender unit configured to attach the predetermined data for the black-channel diagnosis including the loop-back data to the outgoing data to the external device and to pass the outgoing data to the security procedure unit.

CITATION LIST

Patent Literature

PTL 1: JP 2017-215788 A

SUMMARY OF INVENTION

Technical Problem

In the invention described in PTL 1, it is necessary to develop all features to cope with a security event.

Solution to Problem

An electronic control system according to a first aspect of the present invention includes: a security event analysis unit configured to read a log recording an operation of a device and to detect a security event that is an event related to information security; a safety feature execution unit created to execute a safety feature serving as a measure against a safety event that is an event related to functional safety; a security feature execution unit capable of executing a security feature serving as a measure against the security event; a storage unit that stores correspondence information indicating at least one of the safety feature and the security feature corresponding to the security event; and a determination unit configured to identify, based on the correspondence information, a feature corresponding to the security event detected by the security event analysis unit and to cause at least one of the safety feature execution unit and the security feature execution unit to execute the identified feature, wherein the correspondence information records the event classified into at least one of the security events so as to correspond to the safety feature.

Advantageous Effects of Invention

According to the present invention, the development of features to cope with a security event can be facilitated by using a countermeasure feature against a safety event for coping with a security event.

DESCRIPTION OF EMBODIMENTS

Definition of Terms

In the present specification, "safety" and "security" are used to mean as follows. "Safety" means functional safety and is, for example, "absence of unreasonable risk due to hazards caused by malfunctioning behavior of electrical and/or electronic systems" defined in ISO 26262. "Security" means information security and is, for example, preservation of confidentiality, integrity, and availability of information. Hereinafter, "security" is also referred to as "information security".

In the present specification, a state where safety is threatened or a state where safety is not preserved is referred to as a "safety case" or a "safety event", and an operation or a process for resolving or mitigating a safety case is referred to as a "safety feature". Similarly, a state where security is threatened or a state where security is not preserved is referred to as a "security case" or a "security event", and an operation or a process for resolving or mitigating a security case is referred to as a "security feature".

Safety cases include, for example, a device failure, communication disconnection, and the like. Security cases include, for example, parameter rewriting, intrusion detection, communication quality degradation, and the like. Safety features include enabling a degenerate operation of lowering a function to maintain an operation. Security features include parameter initialization and the like.

Embodiment

Hereinafter, an embodiment of an electronic control system 1 will be described with reference to FIGS. 1 to 4.

Figure 1:
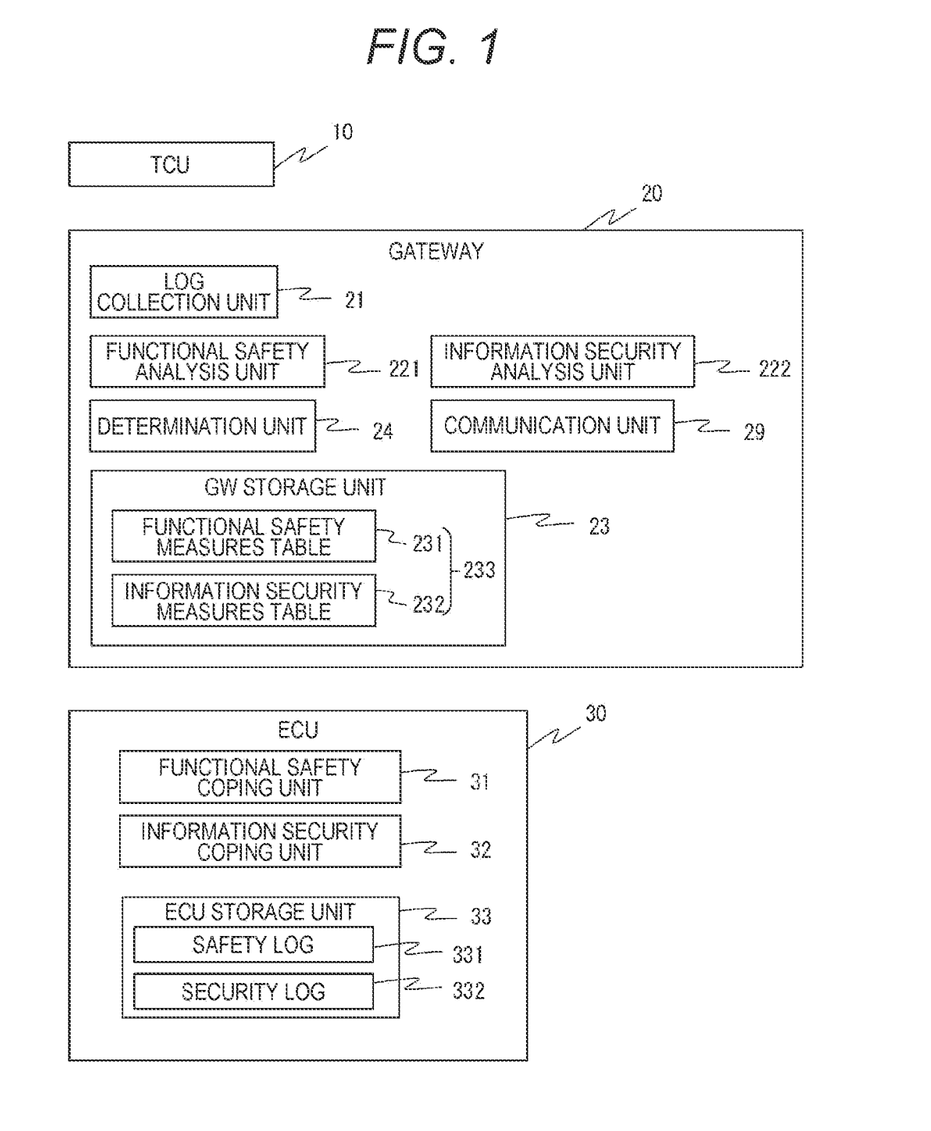
FIG. 1 is a configuration diagram of an electronic control system in an embodiment.

FIG. 1 is a configuration diagram of the electronic control system 1 in the embodiment. The electronic control system 1 includes a gateway 20, an ECU 30, and a TCU 40 that are mounted on a vehicle. Any communication standard, for example, IEEE 802.3 is used for communication between the gateway 20 and the TCU 40 and communication between the gateway 20 and the ECU 30.

The gateway 20 is a device that controls overall communication inside the vehicle. The ECU 30, which is an electronic control unit, collects logs from various equipment mounted on the vehicle and provides the logs to the gateway 20. Further, the ECU 30 takes safety countermeasures and security countermeasures based on an operation command of the gateway 20. The TCU 40, which is a telematic control unit, wirelessly communicates with the outside of the vehicle. Data received from the outside by the TCU 40 is transmitted to the ECU 30 via the gateway 20.

The gateway 20 and the ECU 30 include a CPU that is a central processing unit, a ROM that is a read-only storage device, and a RAM that is a readable/writable storage device, and the CPU realizes functions described later by loading a program stored in the ROM into the RAM and executing the program. The gateway 20 and the ECU 30 may be implemented by a field programmable gate array (FPGA) that is a rewritable logic circuit or an application specific integrated circuit (ASIC) that is an integrated circuit for a particular use, instead of the combination of a CPU, a ROM, and a RAM. In addition, the gateway 20 and the ECU 30 may be implemented by a different combination of components, for example, a combination of a CPU, a ROM, a RAM, and an FPGA, instead of the combination of a CPU, a ROM, and a RAM.

The gateway 20 includes, as functions thereof, a log collection unit 21, a functional safety analysis unit 221, an information security analysis unit 222, a GW storage unit 23, a determination unit 24, and a communication unit 29. The log collection unit 21, the functional safety analysis unit 221, the information security analysis unit 222, the determination unit 24, and the communication unit 29 are implemented by a CPU and the like as described above. The GW storage unit 23 is implemented by a nonvolatile storage device, for example, a flash memory. Hereinafter, the functional safety analysis unit 221 is also referred to as a "safety event analysis unit", and the information security analysis unit 222 is also referred to as a "security event analysis unit".

The log collection unit 21 collects a safety log 331 and a security log 332 from an ECU storage unit 33 of the ECU 30 and stores them in the GW storage unit 23. Note that the safety log 331 and the security log 332 are not illustrated in the GW storage unit 23 in FIG. 1 for convenience of drawing. The functional safety analysis unit 221 analyzes the safety log 331 stored in the GW storage unit 23, identifies a safety case, and assigns an event ID. In the present embodiment, an event ID of a safety case is expressed by a combination of "P" and a number. The functional safety analysis unit 221 identifies a safety case based on, for example, a match between a character string included in the log and a predetermined character string, or a magnitude relationship between a numerical value included in the log and a predetermined threshold value.

The information security analysis unit 222 analyzes the security log 332 stored in the GW storage unit 23, identifies a security case, and assigns an event ID. In the present embodiment, an event ID of a security case is expressed by a combination of "Q" and a number. The information security analysis unit 222 identifies a security case based on, for example, a match between a character string included in the log and a predetermined character string, or a magnitude relationship between a numerical value included in the log and a predetermined threshold value.

The GW storage unit 23 stores a functional safety measures table 231 and an information security measures table 232 that are created in advance. The functional safety measures table 231 describes how to cope with security cases. The information security measures table 232 describes how to cope with safety cases. The functional safety measures table 231 and the information security measures table 232 will be described in detail later. The determination unit 24 determines a measure against a security case and a safety case detected by the functional safety analysis unit 221 and the information security analysis unit 222, and transmits a determined content to the ECU 30. The determination unit 24 refers to the functional safety measures table 231 and the information security measures table 232 in order to determine a measure against the respective cases. Hereinafter, the functional safety measures table 231 and the information security measures table 232 are also collectively referred to as a measures table 233.

The communication unit 29 realizes primary functions of the gateway 20 and performs, for example, destination determination, filtering, and the like on data received from the TCU 40. Note that the processing performed by the communication unit 29 will not be described in detail in the present embodiment.

The ECU 30 includes, as functions thereof, a functional safety feature execution unit 31, an information security feature execution unit 32, the ECU storage unit 33, and an in-vehicle log collection unit 34. The functional safety feature execution unit 31 and the information security feature execution unit 32 are implemented by a CPU and the like as described above. The functional safety feature execution unit 31 and the information security feature execution unit 32 operate based on an operation command transmitted by the determination unit 24 of the GW 20. The operation command transmitted by the determination unit 24 is any of predetermined operation commands and, in the present embodiment, each of these commands is represented by an identifier that is a combination of an alphabet letter and a number. Further, regarding the alphabet letter of an identifier, "E" is used for the identifier for operating the functional safety feature execution unit 31, and "F" is used for the identifier for operating the information security feature execution unit 32.

The functional safety feature execution unit 31 copes with the safety case based on an operation command transmitted from the gateway 20. The functional safety feature execution unit 31 outputs, for example, a stop command to a power source of the vehicle, for example, a motor, based on the operation command from the gateway 20. Operations of the functional safety feature execution unit 31 conform to the provision of "ISO 26262 Part 3 section 7.4.2.3" that is an international standard. The information security feature execution unit 32 copes with the security case based on an operation command transmitted from the gateway 20. The information security feature execution unit 32 outputs, for example, a parameter initial value command to a controller of a headlight based on the operation command from the gateway 20. Hereinafter, the functional safety feature execution unit 31 is also referred to as a "safety feature execution unit", and the information security feature execution unit 32 is also referred to as a "security feature execution unit".

The in-vehicle log collection unit 34 collects operation logs from various devices mounted on the vehicle and stores the operation logs in the ECU storage unit 33 as the safety log 331 and the security log 332. The logs may be classified into the safety log 331 and the security log 332 depending on devices from which the logs are collected or based on the contents of the logs. This is specifically as follows. For example, a log of a device that controls a motor and a brake, which is involved in the movement of the vehicle, may be stored as the safety log 331, and a log of another device that controls a headlight may be stored as the security log 332. Alternatively, for example, in a case where logs are previously tagged with "debug", "notice", "warn", and "error" according to severity, logs with the tags "debug" and "notice" are stored as the security log 332, and logs with the tags "warn" and "error" are stored as the safety log 331.

The ECU storage unit 33 is implemented by a nonvolatile storage device, for example, a flash memory. The ECU storage unit 33 stores the safety log 331 and the security log 332.

Figure 2:
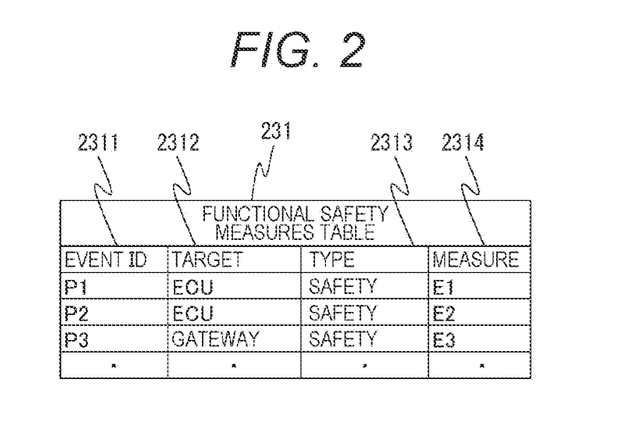
FIG. 2 is a diagram illustrating an example of a functional safety measures table.

FIG. 2 is a diagram illustrating an example of the functional safety measures table 231. The functional safety measures table 231 includes a plurality of records. Each record of the functional safety measures table 231 has fields of Event ID 2311, Target 2312, Type 2313, and Measure 2314. The field of Event ID 2311 stores an identifier of an event. The field of Target 2312 stores identification information of a device that performs a measure. The field of Type 2313 stores information indicating a type of the measure, although it stores only "Safety" in the functional safety measures table 231. The field of Measure 2314 stores a content of a process to be executed as the measure or an identifier of the process to be executed as the measure.

The first record illustrated in FIG. 2 describes that the process of "E1" classified as Safety is executed in the ECU 30 when an event P1 occurs. Further, the third record illustrated in FIG. 2 describes that the process of "E3" classified as Safety is executed in the gateway 20 when an event P3 occurs.

Figure 3:
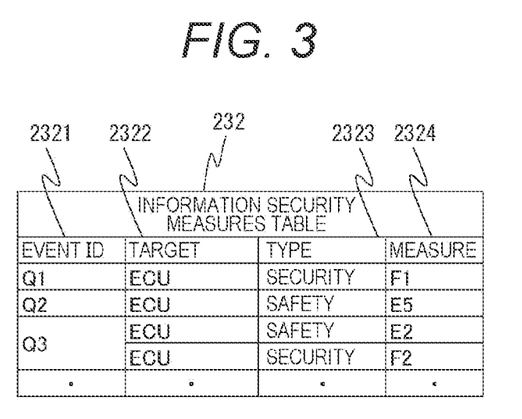
FIG. 3 is a diagram illustrating an example of an information security measures table.

FIG. 3 is a diagram illustrating an example of the information security measures table 232. The information security measures table 232 includes a plurality of records. Each record of the information security measures table 232 has fields of Event ID 2321, Target 2322, Type 2323, and Measure 2324. The information stored in each field is similar to the information stored in the field having the same name in the functional safety measures table 231, and thus, the details thereof are omitted. Note that the field of Type 2323 may store not only "Safety" but also "Security".

The first record illustrated in FIG. 3 describes that the process of "F1" classified as "Security" is executed in the ECU 30 when an event Q1 occurs. The second record illustrated in FIG. 3 describes that the process of "E5" classified as "Safety" is executed in the ECU 30 when an event Q2 occurs. The third record illustrated in FIG. 3 describes that the process of "E2" classified as "Safety" and the process of "F2" classified as "Security" are executed in the ECU 30 when an event Q3 occurs.

Figure 4:
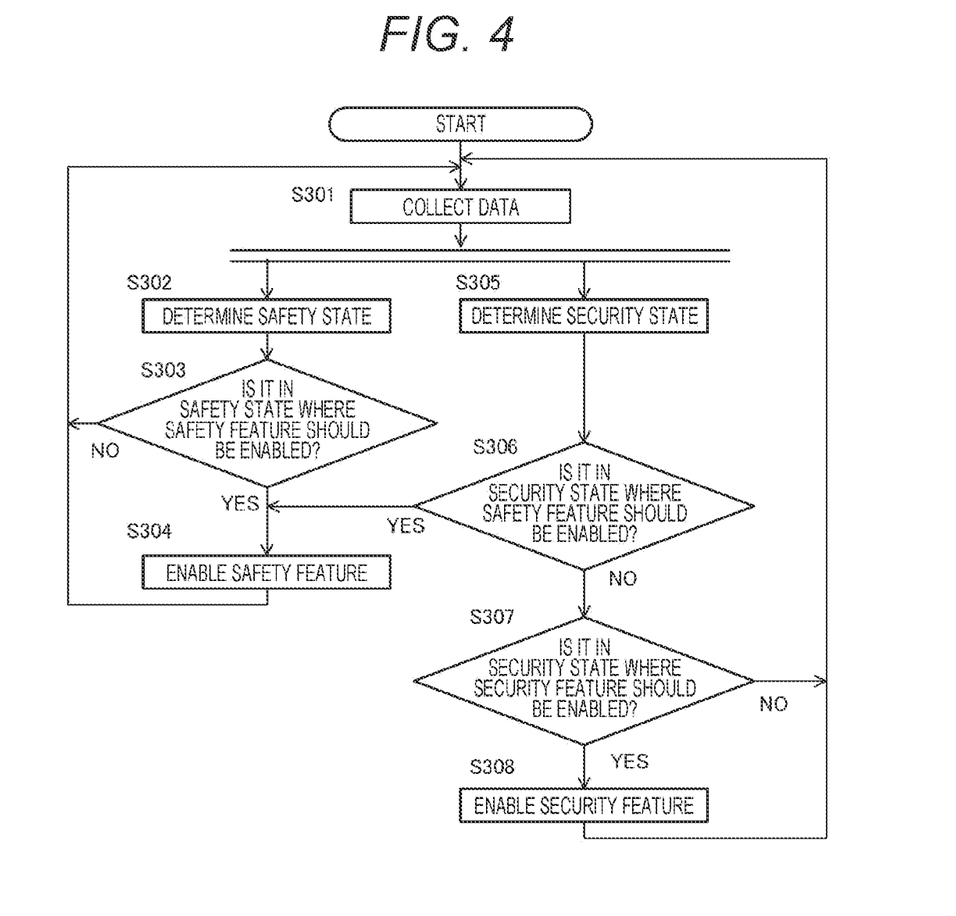
FIG. 4 is a flowchart illustrating processing of a gateway.

FIG. 4 is a flowchart illustrating processing of the gateway 20. The log collection unit 21, the functional safety analysis unit 221, the information security analysis unit 222, and the determination unit 24 of the gateway 20 repeatedly execute the processing illustrated in FIG. 4 while the gateway 20 is powered on. In step S301, the log collection unit 21 collects logs, that is, the security log 121 and the safety log 122 from the ECU 30. After completing the process of step S301, the gateway 20 executes a process of step S302 and a process of step S305 in parallel.

In step S302, the functional safety analysis unit 221 analyzes the safety log 331 collected in step S301, identifies a safety case, and assigns an event ID. In subsequent step S303, the determination unit 24 refers to the functional safety measures table 231 and determines whether it is in a safety state where a safety feature should be enabled. The determination unit 24 proceeds to step S304 when determining that a safety feature should be enabled, and returns to step S301 when determining that no safety feature should be enabled. A specific process of this step is as follows.

The determination unit 24 searches for a record including the event ID identified in step S302 in the column of Event ID 2311 in the functional safety measures table 231. The determination unit 24 makes an affirmative determination in step S303 when the record including the event ID in the column of Event ID 2311 is found, and makes a negative determination in step S303 when no corresponding record is found. The determination unit 24 also makes a negative determination in step S303 when no event ID has been identified in step S302.

In step S304, the determination unit 24 refers to the functional safety measures table 231 or the information security measures table 232 to identify a measure corresponding to the event ID, and causes a target to execute the identified measure. The target that is caused to execute the measure is the ECU 30 or the communication unit 29 of the gateway 20.

In step S305, the information security analysis unit 222 analyzes the security log 332 collected in step S301, identifies a security case, and assigns an event ID. In subsequent step S306, the determination unit 24 refers to the information security measures table 232 and determines whether it is in a security state where a safety feature should be enabled. The determination unit 24 proceeds to step S304 when determining that it is in the security state where a safety feature should be enabled, and returns to step S307 when determining that it is not in the security state where a safety feature should be enabled. A specific process of this step is as follows.

The determination unit 24 searches for a record including the event ID identified in step S305 in the column of Event ID 2321 in the information security measures table 232. The determination unit 24 identifies the record including the event ID in the column of Event ID 2321, and makes an affirmative determination when Type 2323 of the record is "Safety". The determination unit 24 makes a negative determination when the record including the event ID in the column of Event ID 2321 cannot be founded or Type 2323 of the record is "Safety".

In step S307, the determination unit 24 refers to the information security measures table 232 and determines whether it is in a security state where a security feature should be enabled. The determination unit 24 proceeds to step S308 when determining that it is in the security state where a security feature should be enabled, and returns to step S301 when determining that it is not in the security state where a security feature should be enabled. A specific process of this step is as follows.

The determination unit 24 searches for a record including the event ID identified in step S305 in the column of Event ID 2321 in the information security measures table 232. The determination unit 24 identifies the record including the event ID in the column of Event ID 2321, and makes an affirmative determination when Type 2323 of the record is "Security". The determination unit 24 makes a negative determination when the record including the event ID in the column of Event ID 2321 cannot be founded. The processing illustrated in FIG. 3 has been described above.

According to the above-described embodiment, the following advantageous effects can be obtained.

(1) An electronic control system 1 includes: a security event analysis unit 222 configured to read a log recording operations of various devices mounted on a vehicle and to detect a security event that is an event related to information security; a safety feature execution unit 31 created to execute a safety feature serving as a measure against a safety event that is an event related to functional safety; a security feature execution unit 32 capable of executing a security feature serving as a measure against the security event; a GW storage unit 23 that stores a measures table 233 indicating at least one of the safety feature and the security feature corresponding to the security event; and a determination unit 24 configured to identify, based on the correspondence information, a feature corresponding to the security event detected by the security event analysis unit 222 and to cause at least one of the safety feature execution unit 31 and the security feature execution unit 32 to execute the identified feature. The measures table 233 records an event classified into at least one security event, such as the event Q2 or Q3 in the example of FIG. 3, so as to correspond to the safety feature.

Accordingly, since the safety feature execution unit 31 can be utilized to handle a part of the security event, the security feature execution unit 32 only needs to handle the security event excluding that part, which allows facilitating the development of the security feature execution unit 32. Specifically, features to be executed by the security feature execution unit 32 can be reduced, so that the development man-hours and the verification man-hours as well as the cost can be reduced.

The technical idea of the present embodiment is as follows. Countermeasures for safety are standardized as ISO 26262 and the like, and are sophisticated based on years of research and development. On the other hand, countermeasures for security have a shorter history than those of safety, and new matters to be coped with are often found. As a direct solution, separate countermeasures can be taken against safety cases and security cases, but some of the countermeasure schemes are the same or have a containment relationship. In other words, some security cases can be handled by certain safety countermeasure schemes, and some safety cases can be handled by certain security countermeasure schemes.

Here, considering the development histories and asset utilization of security countermeasures and safety countermeasures, the number of developed safety countermeasure schemes is larger than that of developed security countermeasure schemes, and the developed safety countermeasure schemes seem to also have an advantage in terms of stability. Thus, a security case that can be coped with by a safety countermeasure scheme is identified in advance and described in the information security measures table 232 so that such a security case will be handled by the safety countermeasure scheme. This makes it possible to facilitate the development of security countermeasure schemes, and to obtain benefits of reduction in cost and development time.

(2) The electronic control system 1 includes a safety event analysis unit 221 configured to read the log and detect the safety event. The measures table 233 includes the functional safety measures table 231 indicating the safety feature corresponding to the safety event. The determination unit 24 is configured to identify, based on the measures table 233, the security feature corresponding to the safety event detected by the safety event analysis unit 22 and to cause the security feature execution unit 32 to execute the identified security feature. Therefore, the electronic control system 1 can also cope with a safety event.

(3) The safety feature execution unit 31 conforms to the provision of ISO 26262 Part 3 section 7.4.2.3. Therefore, the electronic control system 1 can use the safety feature execution unit 31 with high reliability to cope with a security event.

First Modification Example

The processing in the above-described embodiment may be simplified. For example, each feature to be enabled may be identified and executed without particularly performing the parallel processing.

Figure 5:
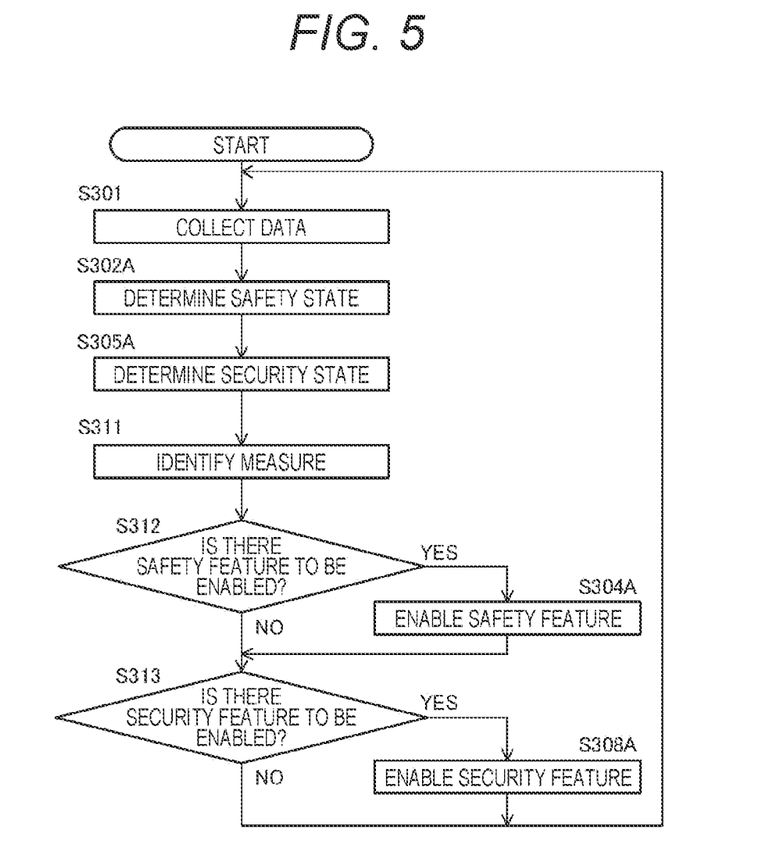
FIG. 5 is a flowchart illustrating processing of the gateway in a first modification example.

FIG. 5 is a flowchart illustrating processing of the gateway 20 in a first modification example. The same processes as those in FIG. 4 are denoted by the same step numbers, and the descriptions thereof will be omitted. In step S301, the log collection unit 21 collects logs, that is, the security log 121 and the safety log 122 from the ECU 30. In subsequent step S302A, the functional safety analysis unit 221 analyzes the safety log 331 collected in step S301, identifies a safety case, and assigns an event ID. In subsequent step S305A, the information security analysis unit 222 analyzes the security log 332 collected in step S301, identifies a security case, and assigns an event ID.

In subsequent step S311, the determination unit 24 refers to the functional safety measures table 231 and the information security measures table 232, and identifies a measure corresponding to the event IDB identified in steps S302A and S305A. For example, according to the example of FIGS. 2 and 3, "E2", "F1", or the like is identified as the measure.

In subsequent step S312, the determination unit 24 determines whether there is a safety feature to be enabled. The determination unit 24 proceeds to step S304A when making an affirmative determination in step S312, and proceeds to step S313 when making a negative determination. For example, when the measure identified in step S311 has an identifier including "E", the determination unit 24 determines that there is a safety feature to be enabled. Note that, when the value in the column of Type 2313 or Type 2323 of the record identified in steps S302A and S305A is "Safety", the determination unit 24 may make an affirmative determination in step S312.

In step S304A, the determination unit 24 enables the safety feature determined to be enabled in step S311, and proceeds to step S312. Specifically, the determination unit 24 transmits the identifier of the safety feature to be enabled, for example, "E1" or the like, to a device that executes the feature, for example, the ECU 30.

In step S313, the determination unit 24 determines whether there is a security feature to be enabled. The determination unit 24 proceeds to step S308A when making an affirmative determination in step S313, and returns to step S301 when making a negative determination. For example, when the measure identified in step S311 has an identifier including "F", the determination unit 24 determines that there is a safety feature to be enabled. Note that, when the value in the column of Type 2313 or Type 2323 of the record identified in steps S302A and S305A is "Security", the determination unit 24 may make an affirmative determination in step S313.

In step S308A, the determination unit 24 enables the security feature determined to be enabled in step S311 and returns to step S301. Specifically, the determination unit 24 transmits the identifier of the security feature to be enabled, for example, "F1" or the like, to a device that executes the feature, for example, the ECU 30. The above is the description of FIG. 5.

According to this first modification example, the simpler processing allows obtaining the same advantageous effects as those of the above-described embodiment. In the present modification example, the functional safety measures table 231 and the information security measures table 232 may be integrated and stored in the GW storage unit 23.

Second Modification Example

In the above-described embodiment, the gateway 20 includes the log collection unit 21, the functional safety analysis unit 221, the information security analysis unit 222, the GW storage unit 23, and the determination unit 24 in addition to the communication unit 29. However, the functions of the log collection unit 21, the functional safety analysis unit 221, the information security analysis unit 222, the GW storage unit 23, and the determination unit 24 may be installed in different devices. As illustrated in the flowchart of FIG. 4, the processing of the log collection unit 21, the functional safety analysis unit 221, the information security analysis unit 222, and the determination unit 24 are related to each other, but there is no problem in operation by exchanging information by communication even if the functions are realized by different devices.

Third Modification Example

In the above-described embodiment, the electronic control system 1 may not include the functional safety analysis unit 221. In this case, the processes of step S302 and step S303 illustrated in FIG. 4 are not executed.

Fourth Modification Example

In the above-described embodiment, the information security analysis unit 222 may refer to an analysis result by the functional safety analysis unit 221. This case is useful for detecting a security event related to a safety event. That is, in the present modification example, the security event analysis unit 222 detects a security event based on a safety event detected by the safety event analysis unit 221 and the security log 332.

Fifth Modification Example

The functional safety feature execution unit 31 and the information security feature execution unit 32 may be installed in different devices. Further, each of the functional safety feature execution unit 31 and the information security feature execution unit 32 may be installed in a plurality of devices. In this case, the fields of Target 2312 of the functional safety measures table 231 and Target 2322 of the information security measures table 232 store information for identifying a device that executes a process.

Sixth Modification Example

The gateway 20 may not include the communication unit 29 that is a function of controlling overall communication. That is, the functions of the log collection unit 21, the functional safety analysis unit 221, the information security analysis unit 222, the GW storage unit 23, and the determination unit 24 may be installed in a device other than the gateway 20.

Seventh Modification Example

Figure 6:
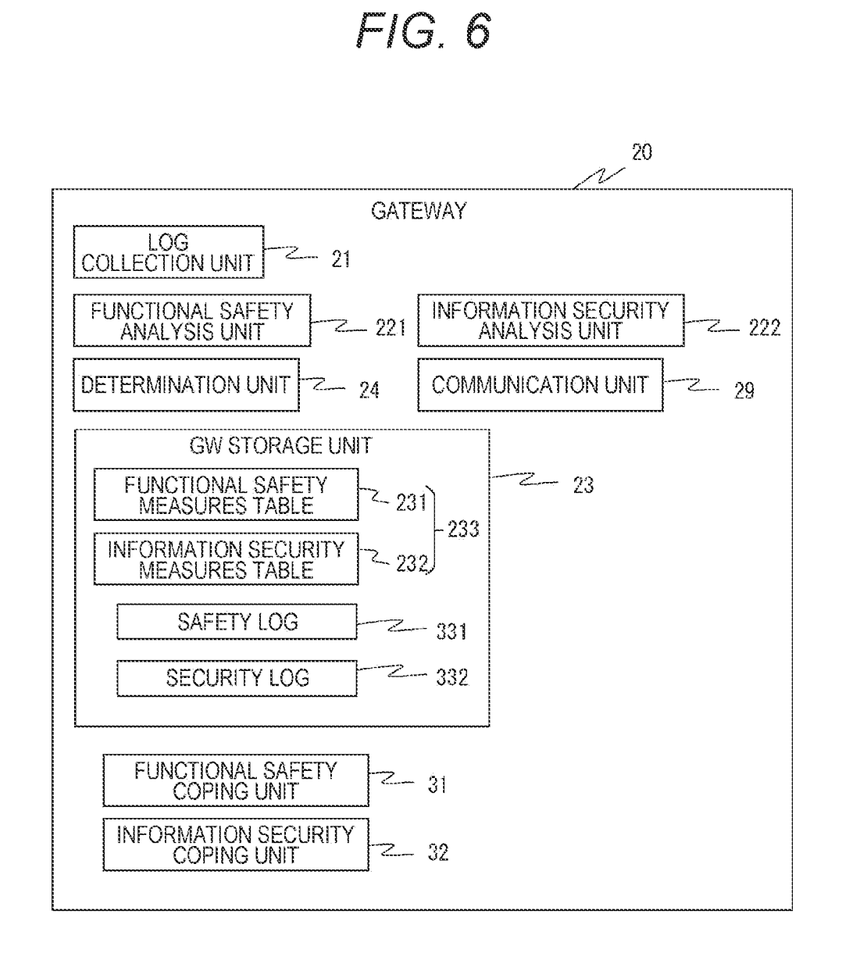
FIG. 6 is a configuration diagram of the gateway in a seventh modification example.

As illustrated in FIG. 6, the gateway 20 may include the functions of the functional safety feature execution unit 31, the information security feature execution unit 32, the ECU storage unit 33, and the in-vehicle log collection unit 34. In this case, the electronic control system 1 may not include the ECU 30.

The above-described embodiment may be modified as the following <1> to <4>.

<1> The safety log 331 and the security log 332 collected by the log collection unit 21 may be stored in a temporary storage unit, not illustrated, instead of the GW storage unit 23.

<2> The gateway 20 may collect logs from a plurality of devices.

<3> The gateway 20 may not include the log collection unit 21 and may be configured to receive a log from another device.

<4> The functional safety measures table 231 and the information security measures table 232 may be integrally configured.

In the embodiment and modification examples described above, the configuration of functional blocks is merely an example. Some functional configurations shown as separate functional blocks may be integrally configured, or a configuration represented in one functional block diagram may be divided into two or more functions. In addition, a part of the function of each functional block may be included in another functional block.

In the embodiment and modification examples described above, it is assumed that a program is stored in a ROM, not illustrated, but the program may be stored in a nonvolatile memory. In addition, the gateway 20 may include an input/output interface, not illustrated, and a program may be read from another device via a medium available to the input/output interface and the gateway 20 when necessary. Here, the medium refers to, for example, a storage medium that can be attached to and detached from the input/output interface, a communication medium, that is, a wired, wireless, or optical network, or a carrier wave or a digital signal propagating through the network. In addition, some or all of the functions realized by a program may be realized by a hardware circuit or an FPGA.

The embodiment and modification examples described above may be combined. Although various embodiments and modification examples have been described above, the present invention is not limited to the contents thereof. Other aspects conceivable within the scope of the technical idea of the present invention also fall within the scope of the present invention.

REFERENCE SIGNS LIST 1 electronic control system
20 gateway
21 log collection unit
23 GW storage unit
24 determination unit
29 communication unit
31 functional safety feature execution unit, safety feature execution unit
32 information security feature execution unit, security feature execution unit
33 ECU storage unit
34 in-vehicle log collection unit
121 security log 122 safety log
221 functional safety analysis unit, safety event analysis unit
222 information security analysis unit, security event analysis unit
231 functional safety measures table
232 information security measures table
233 measures table
331 safety log
332 security log

The invention claimed is:

1. An electronic control system comprising:
a gateway mounted on a vehicle, the gateway comprising:
 a first computer processing unit (CPU) configured to:
  collect a log, the log associated with an operation of a device and comprising a safety log and a security log,
  detect a security event that is an event related to information security,
  detect a safety event that is an event related to functional safety, and
 a first storage device configured to execute a correspondence information table; and
an electronic control unit (ECU) comprising:
 a second CPU configured to:
  perform a security process serving as a measure against the security event, and
  perform a safety process serving as a measure against the safety event, and
 a second storage device configured to store the safety log and the security log,
wherein the electronic control system is further configured to:
 correct the safety log and the security log,
 store correspondence information indicating at least one of the safety process and the security process corresponding to the security event,
 identify, based on the correspondence information, the security process corresponding to the security event, and
 perform the identified security process,
 wherein the correspondence information comprises the event classified into at least one of the security events so as to correspond to the safety process;
wherein the electronic control system is further configured to:
 determine whether the safety process corresponding to the security event is stored as the correspondence information,
 in response to the safety process being stored as the correspondence information, perform the safety process, and
 in response to the safety process not stored being stored as the correspondence information, and the security process corresponding to the security event being stored as the correspondence information, perform the security process.

2. The electronic control system according to claim 1, wherein the ECU is further configured to detect the security event based on the safety event.

3. The electronic control system according to claim 1, wherein the ECU is further configured to:
 identify, based on the correspondence information, the security process corresponding to the safety event, and
 perform the identified security process.

* * * * *